Patented Apr. 14, 1953

2,635,116

UNITED STATES PATENT OFFICE 2,635,116

PROCESS FOR PREPARATION OF AMINE NITRITES

John K. Wolfe, Bethesda, Md., and Kenneth L. Temple, Washington, D. C.

No Drawing. Application August 17, 1945, Serial No. 611,218

6 Claims. (Cl. 260—583)

(Granted under Title 35, U. S. Code (1952), sec. 266)

Our invention relates to a method for the preparation of nitrous acid salts of ammonia and substituted ammonia, that is, amine salts of nitrous acid.

The early chemical literature contains scattered references to nitrites of amines, which, in the cases recorded, indicate that frequently the nitrites of amines are crystalline, stable, and relatively easily obtainable compounds. Many of this class of compound are hygroscopic or deliquescent colored oils not easily purified and some are even unstable at ambient temperature.

The principal early methods for the preparation of amine nitrites consist simply of neutralizing the amine itself with a strong acid, such as hydrochloric acid, and adding thereto a concentrated solution of sodium nitrite. Other methods have employed barium nitrite, silver nitrite, or nitrogen sesquioxide in ether solution. The reactions are summarized by the following equations:

$R_2NH + HCl \rightarrow R_2NHHCl$
$2R_2NH + H_2SO_4 \rightarrow (R_2NH)_2H_2SO_4$
$R_2NHHCl + NaNO_2 \rightarrow R_2NHHNO_2 + NaCl$
$R_2NHHCl + AgNO_2 \rightarrow R_2NHHNO_2 + AgCl$
$(R_2NH)_2H_2SO_4 + Ba(NO_2)_2 \rightarrow 2R_2NHHNO_2 + BaSO_4$
$2R_2NH + N_2O_3 + H_2O \rightarrow 2R_2NHHNO_2$ It is commonly accepted that nitrites of amines either do not exist or are highly unstable compounds which decompose in aqueous solution as fast as they are formed and, accordingly, they are usually postulated as intermediate compounds in the preparation of other products. This somewhat erroneous concept is largely due to the circumstance that nitrous acid, as such, is unknown but when it is needed for the formation of a compound, an excess of some relatively strong mineral acid and sodium nitrite are used to form the nitrous acid in solution. Under such conditions, the amine nitrites are decomposed at the instant of formation by acid catalysis which is usually formulated as follows:

For a primary amine:

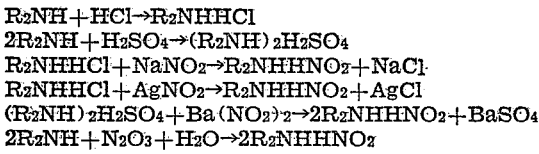

For a secondary amine:

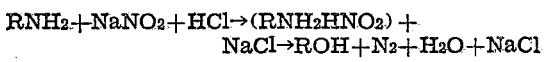

For a tertiary amine:

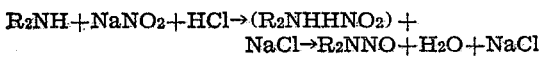

Amine nitrites by virtue of having polar groups and hydrocarbon substituents in the molecule are capable of adsorbing onto surfaces and imparting to such surfaces the properties of non-wettability and non-corrodibility. This phenomenon is described in greater detail in application, Serial Number 611,219, filed of even date herewith by William A. Zisman, Hayward R. Baker, John K. Wolfe and Dwight R. Spessard, now U. S. Patent 2,602,780. In view of the great value of compounds of this class for the formation of such protective films, it is an object of our invention to provide a convenient method for the preparation of amine nitrites in substantially pure form.

It is a second object of our invention to provide a method for the preparation of amine nitrites whereby the product is easily recoverable in pure crystalline form from a non-aqueous solution.

It is a third object of our invention to provide a method for the preparation of amine nitrites which involves the employment of materials none of which will leave in the product corrosive contaminants in the form of traces of corrosive inorganic ions.

It is a further object of our invention to provide a method of preparing a solution of an amine nitrite containing a buffer so that the amine nitrite will be available in the form of a stable solution ready for blending, impregnation of materials, or deposition of films of the nitrite.

Other objects and advantages of our invention will in part be obvious and in part appear hereinafter.

Our invention accordingly comprises a process for the preparation of amine nitrites by reaction between the amine, an alkali metal nitrite, and a weak acid in a suitable solvent in a heterogeneous system, which process involves the relationship of each step to the others thereof, and the relationships of the several reactants to each of the others thereof and to the reaction medium and the steps of the method, which will be hereinafter described in detail, and the invention is not to be limited other than as defined in the claims appended hereto.

One of the earliest reports of the preparation of an amine nitrite is that described in 1889 by Van der Zande, Rec. Trav. Chim. Pays Bas, 8, 205 (1889). He prepared diisopropyl amine nitrite in a process which involved the reaction of diisopropyl amine with hydrochloric acid to form a substantially neutral salt and the reaction of the amine salt with aqueous sodium nitrite. White crystalline amine nitrite, recovered by cooling the reaction mixture, when recrystallized from an organic solvent such as acetone had a melting point of about 138° or 139° C.

In general, amine nitrites prepared by the Van der Zande method, or some variation thereof, are contaminated with inorganic ions, such as chloride or sulfate, from the reactant materials. For many purposes, it is essential that the amine nitrite be substantially free of the chloride and sulfate ions with which it is frequently contaminated when it is prepared by the more or less classical methods. For example, when the amine nitrite is to be used as a corrosion inhibitor in certain types of fluid compositions as described in the above copending patent application Serial Number 611,219, now U. S. Patent 2,602,780, the presence in the amine nitrite of any amount of chloride or sulfate ion substantially reduces its value because of limitations imposed by chloride and sulfate tolerances of the composition.

Briefly, our method of preparing amine nitrites involves the reaction between the amine, a weak acid and an alkali metal nitrite in a solvent capable of selectively dissolving the amine, the alkali metal nitrite used to react with the amine, and the amine nitrite produced by the reaction. Water is to be avoided as a solvent because the amine nitrites are highly soluble in it and their recovery from aqueous solution is an inconvenient procedure. The solvent contributes materially to the success of the process, for not only must it dissolve the starting material but also it must retain in solution the addition products of the amine and the weak acid used. The solvent reaction medium should also be one which will not dissolve the by-products of the reaction to any great extent in order that they will be precipitated and leave in solution only the amine nitrite, thus permitting its recovery in substantially pure form by a simple evaporation step. In the practice of our process we have found that by reacting a solution of an amine with a solution of an alkali metal nitrite and carbon dioxide, the reaction proceeds in solution to form an addition product of the amine and carbon dioxide which in turn reacts with the alkali metal nitrite to give the alkali metal carbonate and the amine nitrite. The solvent used as the reaction medium is selected so that it will retain the amine nitrite in solution and leave behind precipitated alkali metal carbonate. The details of the operation of the process and the steps involved will be more readily understood by reference to the following examples of the preparation of several typical amine nitrites according to our method.

*Example I*

Preparation of diisopropyl amine nitrite (diisopropyl ammonium nitrite): 69 grams of substantially pure finely divided sodium nitrite was dissolved in 300 milliliters of pure methanol and 9 milliliters of distilled water in a reaction vessel comprising a 2 liter flask fitted with a dropping funnel and stirrer. Solid carbon dioxide was added to the nitrite solution in methanol, with constant stirring, and when the solution had cooled to about 0° C., the addition of 140 milliliters of diisopropyl amine was begun and during the entire period of addition, about 1½ hours, crushed solid carbon dioxide was added at intervals in amounts sufficient to maintain the temperature of the reaction mixture within a range of −20° C. to about 0° C. Stirring was continued for 2 hours after all the amine had been added. During the reaction of the amine with the added ingredients a considerable amount of sodium carbonate was precipitated and the reaction foamed strongly because of the evolution of carbon dioxide. About 200 milliliters of methanol was used to wash down foam as it was formed.

Upon completion of the reaction, the precipitated sodium carbonate was filtered off, additional solid carbon dioxide was added to the filtrate, and a second crop of sodium carbonate was obtained. The second filtrate was evaporated substantially to dryness and the crystallized amine nitrite so recovered was recrystallized from isopropyl alcohol to yield 112 grams of white crystalline product with a melting point of 136° to 137°, which corresponds closely to the reported melting point of the pure compound.

The equations for the reactions involved are as follows:

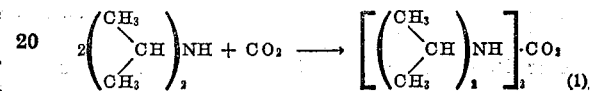

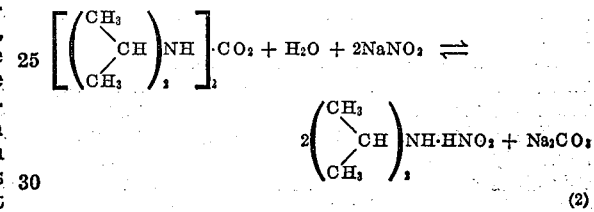

It is seen that by conducting the reaction in a selective solvent such as methanol which will retain the amine nitrite in solution and will not dissolve the carbonate, the equilibrium expressed in Equation 2 can be forced to give substantially a quantitative yield of amine nitrite.

*Example II*

Preparation of diisobutyl amine nitrite (diisobutyl ammonium nitrite): Using half-molar amounts, as defined by the stoichiometric relationships for the reactions involved, 86.5 grams of diisobutyl amine, 34.5 grams of sodium nitrite and 4.5 milliliters of water were dissolved in 300 milliliters of methanol and the solution contacted with an excess of carbon dioxide in substantially the same manner as described in connection with Example I. The reaction was carried out at about 0° C., although in this case, as in the other examples, considerable latitude in the temperature range is permissible.

*Example III*

Preparation of triethyl amine nitrite (triethyl ammonium nitrite): Using substantially the same process as that described in Example I, 140 milliliters of triethyl amine, 9 milliliters of water and 69 grams of sodium nitrite were dissolved in 500 milliliters of methanol and the solution contacted with excess carbon dioxide. The product was refined to a yield of 100 grams (68%).

Since the triethyl amine nitrite is a very deliquescent material, its recovery in crystalline form had to be carried out in a more elaborate fashion than the recovery processes described in the preceding examples. The evaporation of the methanol solution of amine nitrite was accomplished by admitting dry air to the evaporation vessel, acetone was added to the dried residue and the resulting solution again evaporated to insure complete removal of the alcohol. The material thus recovered was dried in an evacuated desiccator to a constant weight. The melting point of the product thus obtained was 97° to 98° C.

Example IV

Preparation of mono-isopropyl amine nitrite (mono-isopropyl ammonium nitrite): The mono-isopropyl amine nitrite was prepared by reacting 85 milliliters of mono-isopropyl amine with 9 milliliters of water, 69 grams of sodium nitrite and an excess of solid carbon dioxide in 400 milliliters of methanol as the reaction medium at a temperature of about 0° C. The amine was first dissolved in a small amount of methanol and solid carbon dioxide slowly added until heat ceased to be evolved, that is, until all of the amine had been converted to the carbonate. This solution of the amine carbonate in methanol was added dropwise to the methanol solution of the sodium nitrite substantially as the amines were added in the processes of the preceding examples. Since mono-isopropyl amine nitrite is a deliquescent material, it was worked up in the same manner as was the deliquescent triethyl ammonium nitrite. From the reaction the yield of amine nitrite was 79 grams, 74% of theoretical, and repeated recrystallization of the product from a solution of 4 parts by volume of ethyl acetate plus 1 part by volume of isopropyl alcohol gave a product having a melting point of 49° to 50° C.

Example V

Preparation of di-isopropyl amine nitrite (di-isopropyl ammonium nitrite): 85 grams of substantially pure finely-divided potassium nitrite was dissolved in 400 milliliters of methanol together with 9 milliliters of water. The solution was cooled and maintained about 0° to 10° C. by the addition of solid carbon dioxide during the addition of 140 milliliters of diisopropyl amine, done slowly over a period of 2 hours. The mass was maintained in the stated temperature range for 3 hours by further periodic additions of solid carbon dioxide. The potassium carbonate precipitated during the reaction and the methanol solution of diisopropyl amine nitrite worked up by evaporation to give a yield of 25 grams of the amine nitrite.

Example VI

For some purposes it is not essential that the end product of the process be worked up to a pure sample of the amine nitrite. It is sufficient and, for some purposes advantageous, to keep it in solution. For example, the amine nitrites are very useful as inhibitors of humid corrosion in vacant metal-enclosed spaces and it is the practice to maintain an equilibrium amount of the amine nitrite vapor in the space to promote the adsorption of a protective film on the metal surface. To maintain such equilibrium it is convenient to suspend in the space a reserve amount of the amine nitrite by suspending therein a foraminous material, such as paper, impregnated with the compound. Inasmuch as the amine nitrite will be decomposed at a pH which is too far in the alkaline or acid range, setting of the pH of the impregnated carrier in a range from about 7 to about 9 is practically a necessity. By the processes described in the preceding examples, it is possible to derive a solution of the amine nitrite containing an amount of alkali metal bicarbonate sufficient to stabilize its pH in the desired range. The solution thus derived can be used directly for impregnating such carriers as paper, pasteboard, cloth, porous ceramics, and silica gels.

In the examples described above, the reaction temperature was kept at about 0° C. largely for reasons of convenience. Actually a fairly wide range of temperature from about —20° C. to about 40° C. can be employed. The higher temperatures should be skirted to avoid loss of amine by volatilization. The very low temperatures should be avoided to permit the employment of a reasonably rapid rate of reaction.

As stated previously the solvent employed as the reaction medium should be matched to the products obtained in the reaction. It is desirable that it have a relatively low boiling point to permit convenient recovery of the product from solution and be capable of dissolving the amine and nitrite reactants. It is preferable that it have a much greater solvent power for the amine nitrite than for the alkali metal carbonate produced. We have found that the lower alcohols and ketones, such as methanol, ethanol, propanol, isopropanol, acetone and ethyl ketone can be successfully matched to the reactants and products in the manner outlined.

Since water enters the reaction the amount necessary is at least the stoichiometric quantity but the amount used is not critical and can be varied. However, it is desirable to keep it at a minimum because its presence affects the yield and makes more difficult the recovery of the product because of the high solubilities of the materials produced therein.

The process has been described in the examples as employing solid carbon dioxide. This feature is a matter of convenience for the addition of the solid carbon dioxide serves the double purpose of furnishing one of the reactants and of cooling the mixture. The reaction can be conducted in a pressure vessel at pressures from atmospheric to several thousand pounds per square inch using gaseous carbon dioxide as the reactant.

The process described is generally applicable to the preparation of amine salts and the following primary, secondary, and tertiary salts have been prepared according to the processes described and variations thereof in reactants, solvent media, and temperatures: diisopropyl amine nitrite, diisobutyl amine nitrite, dicyclohexyl amine nitrite, triethyl amine nitrite, mono-isopropyl amine nitrite.

Since certain changes can be made in carrying out the above process by variations in the steps thereof and ingredients used without departure from the scope of the invention, it is intended that all matter contained in the above description shall be interpreted as illustrative and not in a limiting sense.

The invention described herein may be manufactured and used by or for the Government of the United States of America for governmental purposes without the payment of any royalties thereon or therefor.

Having described our invention what we claim as new and desire to secure by Letters Patent of the United States is:

1. A method of preparing an amine nitrite which comprises reacting carbon dioxide with an amine selected from the group consisting of alkylamines and cycloalkylamines added gradually to and dissolved in a large excess of methanol containing in solution an alkali metal nitrite and water in the ratio of 2 mols of the former to 1 mol of the latter and maintained at a temperature between about —20 and 40° C., the total of the amine added to the methanol in the reaction being in equimolar ratio with the alkali metal nitrite in the methanol and the methanol being a solvent for the amine nitrite but a non-solvent for the alkali metal carbonate formed in the reaction.

2. A method for preparing an alkylamine nitrite which comprises reacting carbon dioxide with an alkylamine added gradually to and dissolved in a large excess of methanol containing in solution sodium nitrite and water in the ratio of 2 mols of the former to 1 mol of the latter and maintained at a temperature between about $-20$ and $0°$ C., the total of the alkylamine added to the methanol in the reaction being in equimolar ratio with the sodium nitrite in the methanol and the methanol being a solvent for the amine nitrite but a non-solvent for the sodium carbonate formed in the reaction.

3. The method of preparing an amine nitrite as defined in claim 1, wherein the carbon dioxide is brought into the reaction and the low reaction temperature maintained by the addition of solid carbon dioxide to the methanol solution of the reactants.

4. A method of preparing a secondary alkylamine nitrite which comprises reacting carbon dioxide with a secondary alkylamine added gradually to and dissolved in a large excess of methanol containing in solution sodium nitrite and water in the ratio of 2 mols of the former to 1 mol of the latter and maintained at a temperature between about $-20$ and $0°$ C., the total of the secondary alkylamine added to the methanol in the reaction being in equimolar ratio with the sodium nitrite in the methanol and the methanol being a solvent for the secondary alkylamine nitrite but a non-solvent for the sodium carbonate formed in the reaction.

5. The method of preparing a secondary alkylamine nitrite as defined in claim 4, wherein the secondary amine is diisopropylamine.

6. The method of preparing a secondary alkylamine nitrite as defined in claim 4, wherein the secondary amine is diisobutylamine.

JOHN K. WOLFE.
KENNETH L. TEMPLE.

References Cited in the file of this patent

Ray et al., Chem. Soc. Jour., vol. 101 (1912), pp. 216.

Kijner et al., Bul. Soc. Chim. de France (3), 16 (1896), p. 1284.

Meyer et al., Ber. Deut. Chem. Ges. 9 (1876), p. 535.